May 25, 1954  W. A. DUFFIELD  2,679,169
AUTOMATIC VARIABLE SPEED TRANSMISSION
Filed June 16, 1950  4 Sheets-Sheet 3
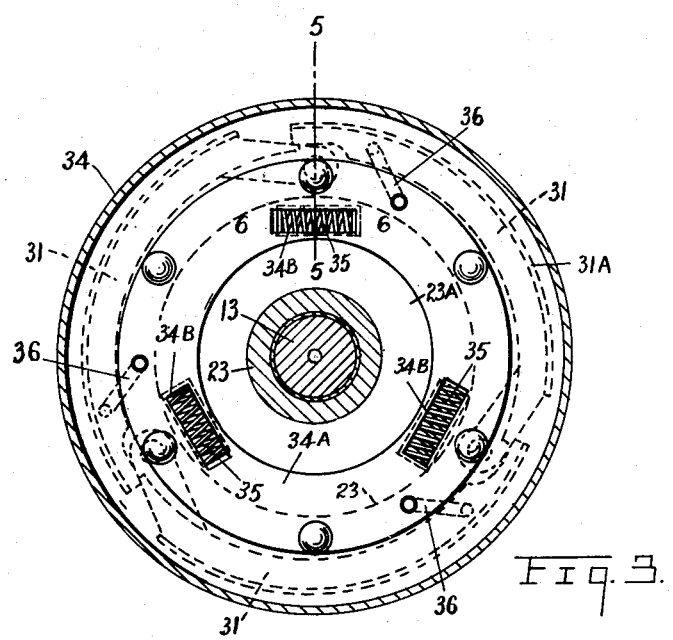
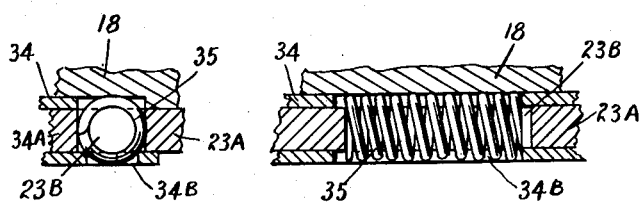
Inventor
William A. Duffield
By  R G Gowling
Attorney Inventor
William A. Duffield
By [signature]
Attorney Patented May 25, 1954

2,679,169

UNITED STATES PATENT OFFICE 2,679,169

AUTOMATIC VARIABLE SPEED TRANSMISSION

William A. Duffield, Mimico, Ontario, Canada

Application June 16, 1950, Serial No. 168,536

2 Claims. (Cl. 74—731)

This invention relates to automatic variable speed transmissions incorporating a fluid torque converter-coupling and reduction gearing for the application of split torque to a driven shaft during direct or high-ratio drive.

Fluid torque converters of the combination converter-coupling type are now, after many years, finding their way into automotive fields as an important unit of automatic transmission design. These converter-coupling units start out as a torque converter, and as long as the runner torque is greater than the impeller torque they function as such, but when the runner torque drops to equality with the impeller torque, the reaction member starts to run with the impeller and runner. At this point torque conversion ceases and thereafter the unit functions as a fluid coupling.

It is possible to provide approximately four to one torque multiplication with converters of this type, but this advantage is measured at stall speed and unfortunately it disappears rather quickly, too much so for satisfactory automotive use by itself alone. Therefore, it is necessary to use gearing to extend the acceleration range for successful overall motor vehicle operation, and since the converter is in itself an infinitely variable speed torque unit, the gearing should be entirely automatic and torque speed responsive in its operation.

This invention relates to power transmission means between a driving and a driven shaft, which includes a fluid torque converter of the converter-coupling type and a reduction gearing, and has for its object so to construct such transmission means that its action is automatic and in accordance with the power available and the torque required.

The primary object of the invention is to provide a transmission which will meet the varied requirements of load, speed and torque, particularly in the operation of motor driven vehicles.

A further object of the invention is to have the automatic transmission capable of "push starting" the engine efficiently at low vehicle speed without the provision of additional means for this purpose.

A further object of the invention is to provide a transmission in which the change of speed and torque are not manually controlled, but are automatic and are subject to the control of the power supplied to the transmission and the resistance of the load at any load speed.

A still further object of the invention is to provide an automatic transmission design which is simple, efficient and which can be produced at a cost comparable to that of current manually operated transmission systems.

From actual tests conducted with a fluid torque converter of the converter-coupling type, it has been found that the reaction member runs forward, when torque conversion ceases, and can become a second fluid coupling runner similar in performance to that set forth in my United States Patent No. 2,373,234, and it is a further object of this invention to so construct this reaction member that it provides a suitable surface upon the back of the reaction blades to make it an efficient fluid coupling runner and thus to use this member as such to control the gear carrier, to put the gearing into or out of operation.

At such time as the reaction member of the fluid torque converter becomes a fluid coupling runner and starts to run the gear carrier forward there is a prolonged and inefficient slip period before this member and the gear carrier reach approximately the same speed as the impeller member of the fluid torque converter, and it is still a further object of this invention to reduce this slip element to a negligible factor.

A still further object of the invention is to produce an automatic transmission which eliminates the use of hydraulically operated clutches, bands, valves and extremely high oil pressures, electrically operated valves, solenoids and switches.

These and further objects of the invention will be apparent from a study of the specification and drawings in which:

Figure 3 is a cross section of the transmission on the line 3—3 of Figure 1, showing the centrifugal clutch synchronizing mechanism.

Figure 5 is a partial sectional view on the line 5—5 of Figure 3, showing the mounting of the control drum springs.

Figure 6 is a partial sectional view on the line 6—6 of Figure 3, showing the control drum spring holding the drum energized in one direction relative to the gear carrier.

Figure 1:
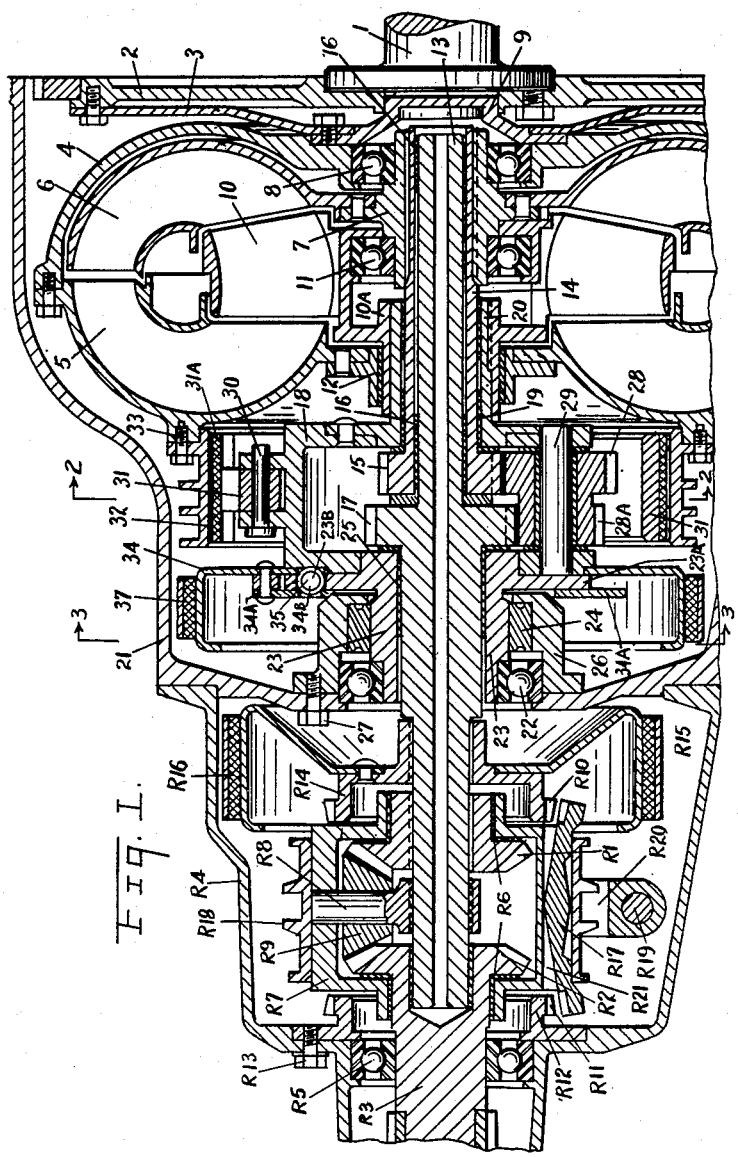
Figure 1 is a vertical longitudinal section of the complete transmission assembly.
Figure 2:
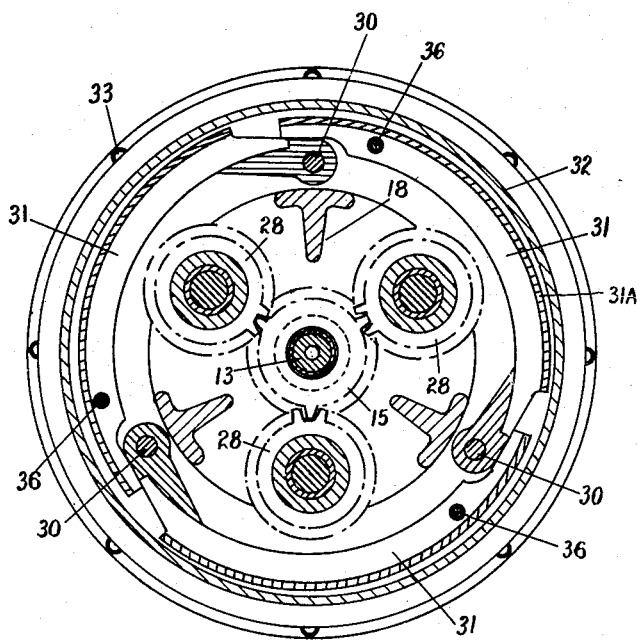
Figure 2 is a cross section of the transmission on the line 2—2 of Figure 1, showing the gearing, gear carrier and centrifugal clutch.
Figure 4:
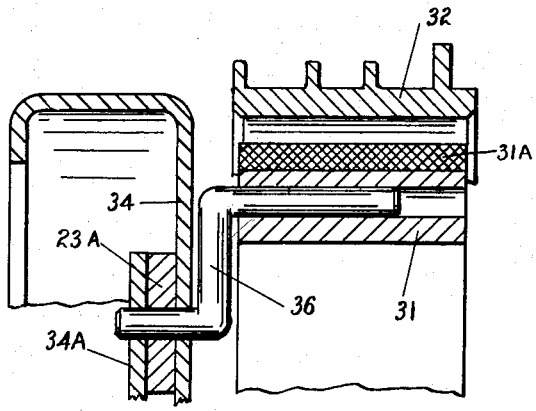
Figure 4 is an enlarged detail view of the connecting links between the control drum and the centrifugal clutch.

Referring to the drawings, the flanged input shaft 1 from the prime mover is coupled to the flywheel 2. The shell or housing 4 of the fluid torque converter is supported within the flywheel 2 by means of the spiggot 9 and is connected to the flywheel 2 by means of the spider 3 which forms a flexible mounting for the fluid torque converter.

The fluid torque converter is comprised of the following elements: the impeller 5 which is bolted to the housing 4 to form a closed unit, the turbine or runner member 6, and the reaction member 10. The runner member 6 is provided with a hub 7, which in turn is mounted in the housing 4 of the fluid torque converter by the ball bearing 8. The hub 7 is splined to the forward end of the drive shaft 14. The input sun gear 15 is integral with the rear end of the drive shaft 14. The drive shaft 14 forming a direct connection between the runner member 6 and the sun gear 15.

The reaction member 10 of the fluid torque converter is mounted on the hub 7 of the runner member 6, by means of the ball bearing 11 and, through its hub 10A, is splined to the sleeve 20.

The impeller 5 is mounted upon the bushing 12 on the hub 10A of the reaction member 10, to form the rear support of the fluid torque converter.

The main transmission shaft 13 extends the full length of the transmission, and carries the bushings 16, upon which the drive shaft 14 is journalled. The transmission shaft 13 is upset immediately to the rear of the input sun gear 15 to form the output sun gear 17.

A gear carrier 18, in the form of a housing, is riveted to the flanged sleeve 20 and is therefore positively connected to the reaction member 10 of the fluid torque converter. The rear end of the gear carrier 18 is bolted to the flange 23A of the sleeve 23. The main transmission shaft 13 is journalled within this sleeve 23 by the bushings 25 to the rear of the output sun gear 17. The gear carrier 18 is therefore supported on the main transmission shaft 13 on either side of the sun gears 15 and 17. The gear carrier 18 supports the journal pins 29, usually three in number, which in turn carry the planetary pinions 28 and 28A.

The planetary pinion 28 meshes with the input sun gear 15, while the planetary pinion 28A meshes with the output sun gear 17.

The gear carrier 18 also forms the inner member of the centrifugal clutch and has mounted thereon the pins 30, three in number and equally spaced around the periphery of the carrier. Each of the pins 30 forms a pivot mounting for the clutch shoes 31, each shoe being in the form of an arc approximately one third of the circumference of the space between the outer surface of the gear carrier 18 and the inner surface of the clutch drum 32. Each of the clutch shoes 31 is equipped with a friction lining 31A for frictional engagement with the inner surface of the clutch drum 32 when the clutch shoes move outwards under the effect of centrifugal force.

The outer member or clutch drum 32, of the centrifugal clutch, is secured to the back of the impeller 5 of the fluid torque converter, on the studs 33. The gear carrier 18 being the inner member of the centrifugal clutch is therefore positively connected with and will rotate with the reaction member 10 of the fluid torque converter, while the outer drum 32 of the centrifugal clutch is positively connected with and will rotate with the impeller 5 of the fluid torque converter.

The flanged sleeve 23 extending rearwardly from the gear carrier 18, is mounted in the rear wall of the transmission casing 21 upon the ball bearing 22. The sleeve 23 forms the inner race of the one-way brake 24, the outer race 26 of which is bolted to the rear wall of the transmission casing 21 by the bolts 27.

The gear carrier 18 is cut back adjacent to the outer periphery of the flange 23A to provide a space into which the drum 34 is fitted. The drum 34 has secured to it a secondary ring or flange 34A, spaced out from the drum 34 to face on the opposite side of the flange 23A. The drum 34 is therefore captive on the flange 23A and can rotate thereon. The face of the flange 23A is provided with a series of rectangular slots 23B placed tangentially around the flange, in which are seated the springs 35. Both the drum 34 and its secondary flange 34A are provided with similar rectangular slots 34B, the slot in the flange 34A being slightly less in width than the slots 23B in the flange 23A and drum 34, thus holding the springs 35 captive in the slots. The lengths of the slots are so proportioned that the springs exert a pressure on the drum 34, energizing the drum in one direction relative to the flange 23A and the gear carrier 18, as illustrated in Figure 6 of the drawings. Connecting links 36 are seated at one end in the drum 34, while the other ends of the links are seated in the free ends of the clutch shoes 31, opposite from their pivots 30.

Figure 7:
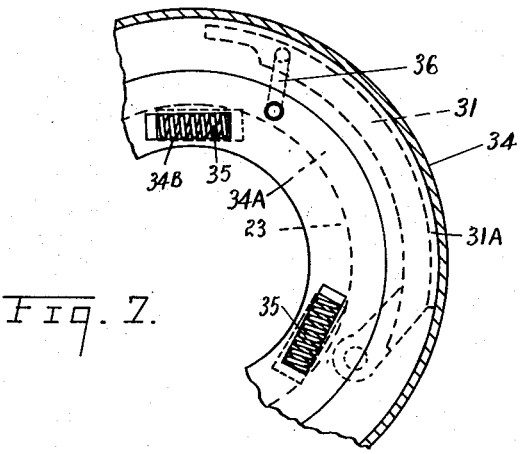
Figure 7 is a partial sectional view similar to Figure 3, but showing the clutch shoes in the engaged position.

As the ends of the connecting links 36, which are seated in the drum 34, can only move with the drum in a radial path, while the other ends of the links are seated in the free ends of the clutch shoes 31 which, in turn, are pivoted at their opposite ends, any outward movement of the free ends of the clutch shoes about their pivots will tend to cause a slight rotation of the drum 34 relative to the gear carrier 18 with consequent compression of the springs 35. The compressed springs 35 will therefore tend to return the clutch shoes 31 to their free or unengaged position when centrifugal force, holding them in the engaged position, is reduced. The engaged and unengaged positions of the clutch shoes 31 are shown in Figures 3 and 7. The combination of the control drum 34 and the connecting links 36 ensures synchronization of the movement of the clutch shoes 31 and consequent even pressure and wear of the moving parts.

Due to the energizing of the drum 34 in one direction, relative to the gear carrier 18, the connecting links 36 tend to withdraw or keep the clutch shoes 31 in the released position until such time as centrifugal force, acting on the clutch shoes 31, forces the shoes outward against the pressure of the springs 35 acting through the links 36.

The drum 34 is controlled manually by the band 37 to withdraw the clutch shoes 31 from contact with the clutch drum 32 below a predetermined R. P. M., and to hold the gear carrier 18 from forward rotation to supply engine braking.

The reverse gear mechanism consists of a bevel gear R1, which is splined to the main transmission shaft 13, and a similar bevel gear R2, which is integral with the tail shaft R3. The tail shaft R3 is mounted in the reverse gear case R4 upon the ball bearings R5. Mounted about the bevel gears R1 and R2, upon the bushings R6, is the reverse gear carrier R7. This carrier R7 has mounted within it, on the pins R8, the spider pinions R9 which mesh with the bevel gears R1 and R2.

The movement of the reverse gear carrier R7 is controlled positively by the clutches R10 and R11. The ring R12 carrying the reverse clutch R11 is bolted to the reverse gear case R4 by the bolts R13, while the ring R14 carrying the forward clutch R10 is rivetted to the drum R15. This drum R15 is controlled by the band R16 to stop rotation of the main transmission shaft 13 during shifting of the reverse gearing to forward or reverse positions. Clutch engaging dogs in the form of rocker arms R17, usually two in number, are mounted in slots R21 in the reverse gear carrier R7 and are controlled by the sliding collar R18 which is shifted fore and aft by the shifter shaft R19 and fork R20, to effect neutral as shown in Figure 1 of the drawings, or to the rear to engage with the reverse clutch R11, or to the forward position to engage with the forward clutch R10.

In the operation of this transmission, assuming the prime mover to be rotating the fluid torque converter impeller 5 slowly, at normal idling speed, the clutch R10 is engaged to establish connection of the power plant to the vehicle for forward running. During this operation, the band R16 is applied momentarily to stop the drum R15 and the main transmission shaft 13 from rotating, which permits easy engagement of the forward clutch R10 by the rocker arms R17.

The prime mover is now accelerated and the fluid torque converter starts to turn the turbine or runner member 6 by multiplied torque which is carried to the main transmission shaft 13 by means of the drive sleeve 14, sun gear 15 and planet pinions 28 and 28A. This gearing again multiplies the converter torque by the ratio designed into the gear unit.

The reaction force of the reaction member 10 of the fluid torque converter and the reaction force of the gear carrier 18 is taken into the transmission case 21 by the one-way brake 24, the reaction member 10 of the fluid torque converter being coupled positively to the gear carrier 18 by means of the sleeve 20.

As the speed of the runner member 6 increases, the torque upon that member gradually decreases to equality with that of the impeller member 5 and when this point is reached, the actual conversion has ceased within the fluid torque converter unit and the unit starts to function as a fluid coupling. However, at this point, the reaction member 10 has also ceased to have any fluid reaction thrust upon it, and from this point onwards becomes a second fluid clutch runner similar to the multiple runner fluid clutch described in my United States Patent No. 2,373,234, and when connected positively to the gear carrier 18, as in this design, it picks up the carrier and thereby controls by torque-speed sensitive means, the engagement or disengagement of the reduction gearing according to the road load demand.

In order to reduce to a negligible factor the combined slip of the two driven members 6 and 10 of the converter unit, running as a multiple fluid clutch, the centrifugal clutch about the gear carrier 18 clutches the carrier 18 to the clutch drum 32, when the gear carrier 18 exceeds a predetermined R. P. M. and overcomes the effect of the springs 35 acting through the links 36 on the clutch shoes 31. When contact is solidly established in the centrifugal clutch, the gear carrier 18 and the impeller member 5 are directly coupled together, and the gear carrier 18 and the reaction member or second runner member 10 are then driven by and at the same speed as the impeller member 5.

The transmission is now in direct or high ratio drive, but, the power from the prime mover is now reaching the output sun gear 17 by two paths. One path is by direct mechanical means by way of the flywheel 2, spider 3, converter housing 4, impeller 5, clutch drum 32 and shoes 31 to the gear carrier 18, pins 29, pinions 28 and 28A to the output sun gear 17.

The other power path is by fluid means from the impeller 5 to the turbine or runner member 6, now operating as a fluid coupling, the hub 7, shaft 14, sun gear 15, planet pinions 28 and 28A to the output sun gear 17. The percentage of torque being transmitted by mechanical and fluid means being determined by the gear ratio of the planet reduction gearing. Note: frictional drag of the bearings, gearing and converter fluid friction drag all add onto the side of mechanical drive.

From the above, it is obvious that when the transmission is operating in direct or high ratio drive, the fluid torque converter, operating as a fluid coupling, is only called upon to transmit a greatly reduced portion of the load it carried when operating as a fluid torque converter, the percentage being dependent upon the reduction gear ratio.

As the load increases and the speed decreases, as when negotiating a steep grade or tough going in snow or sand, the transmission must shift down from direct or high ratio drive to use the reduction gearing and fluid torque converter as a converter. This change down will take place by the drop in efficiency of the centrifugal clutch, due to speed reduction and for the same reason the reaction member 10 of the fluid torque converter will exert an effort to run backwards and, depending upon the road load and speed, and assisted by the springs 35 acting through the links 36 on the clutch shoes 31, disengage the centrifugal clutch and go into the reduction gearing and converter conversion. It will be readily appreciated from the above explanation of the operation of this device that the transmission is speed and torque sensitive.

At times it is advantageous to use the reduction gearing before it would automatically cut in. This can be done by applying the band 37 upon the drum 34.

As the ends of the springs 35 are constrained by the ends of the slots formed in the gear carrier 18, the drum 34 and the flange 23A of the sleeve 23, the effect of stopping the drum 34 from rotating, by applying the band 37, also holds the gear carrier 18 from rotating, through contact of the ends of the springs 35 with the various elements forming the walls of the slots. The stopping of rotation of the drum 34 has the effect of actuating the connecting links 36 to cause withdrawal of the clutch shoes 31 from contact with the drum 32 and disengagement of the centrifugal clutch. The same operation holds the unit in gear to apply engine braking on long steep grades, by preventing the gear carrier 18 from running forward.

When it is desired to start up the engine by "push starting," it is only necessary to see that the transmission is set in the forward operating position. In push starting the vehicle, the tail shaft R3 becomes the drive shaft and transmits power through the main transmission shaft 13, and thence through the gearing and gear carrier to the fluid torque converter. The power path through the gearing leads to the runner member 6, while the path through the gear carrier 18 leads to the reaction member 10. It is to be noted that no additional equipment, such as a secondary oil pump operated by the tail shaft, usually required because the oil pump operated by the engine is dead, is necessary with the above described transmission.

Reverse drive is accomplished by engaging the reverse clutch R11 by shifting the collar R18 to the rear, thus locking the carrier R7 to the reverse gear housing R4. The bevel gear R1, acting through the pinions R9, to turn the bevel gear R2 and tail shaft R3 in the reverse direction.

What I claim is:

1. In an automatic variable speed transmission, a fluid torque converter unit of the converter-coupling type comprising an impeller, a runner member and a reaction member, said reaction member being stationary while the runner torque is greater than the impeller torque; a gear carrier, a gear reduction unit mounted in the gear carrier, a centrifugal clutch comprising centrifugal elements mounted on said carrier and a drum mounted to rotate with the impeller of the fluid torque converter, a drum mounted on said gear carrier, said drum being energized in one direction with respect to the gear carrier, links connecting said drum with the centrifugal elements of the centrifugal clutch, a brake band about the said latter drum, said brake band when applied to the drum effecting disengagement of the centrifugal clutch, below a predetermined value of R. P. M., and means positively coupling the reaction member to said gear carrier adapted to drive said gear carrier forward when the fluid torque converter ceases to convert and acts as a coupling, thereby effecting an engagement of the centrifugal clutch for direct or high ratio drive.

2. In an automatic variable speed transmission, a fluid torque converter unit of the converter-coupling type comprising an impeller, a runner member and a reaction member, said reaction member being stationary while the runner torque is greater than the impeller torque; a gear carrier, a gear reduction unit mounted in the gear carrier, comprising an input sun gear connected to and driven by the said runner member of the fluid torque converter, an output sun gear, a driven shaft connected to said output sun gear and planetary reduction gears meshing with said input and output sun gears, a centrifugal clutch comprising pivoted centrifugal clutch elements mounted on said gear carrier and a drum mounted on and rotating with the casing and impeller of the fluid torque converter and adapted to be engaged with the gear carrier by said centrifugal clutch elements, a drum freely mounted on said gear carrier, spring means between said gear carrier and said latter drum, said spring means energizing said drum in one direction with respect to the gear carrier, synchronizing links connecting said drum with the centrifugal clutch elements and normally holding said centrifugal elements from engagement with the clutch drum during low speed drive, a brake band about the drum on the gear carrier, said brake band when applied to the drum, effecting disengagement of the centrifugal clutch below a predetermined value of R. P. M., and means positively coupling the reaction member to said gear carrier, said reaction member adapted to drive said gear carrier forward when the fluid torque converter ceases to convert and acts as a coupling, thereby effecting an engagement of the centrifugal clutch for direct or high ratio drive.

References Cited in the file of this patent

UNITED STATES PATENTS

| Number | Name | Date |
|---|---|---|
| 1,357,769 | Fuchs | Nov. 2, 1920 |
| 2,074,781 | Duffield | Mar. 23, 1937 |
| 2,324,703 | Hoffman | July 30, 1943 |
| 2,324,713 | McFarland | July 20, 1943 |
| 2,381,772 | Pentz | Aug. 7, 1945 |
| 2,441,490 | Jandasek | May 11, 1948 |
| 2,465,739 | McGill | Mar. 29, 1949 |
| 2,498,797 | Duffield | Feb. 28, 1950 |
| 2,555,702 | Railton | June 5, 1951 |

FOREIGN PATENTS

| Number | Country | Date |
|---|---|---|
| 461,947 | Great Britain | Feb. 26, 1937 |
| 558,445 | Germany | Sept. 8, 1932 |
| 723,717 | France | Apr. 14, 1932 |